UNITED STATES PATENT OFFICE.

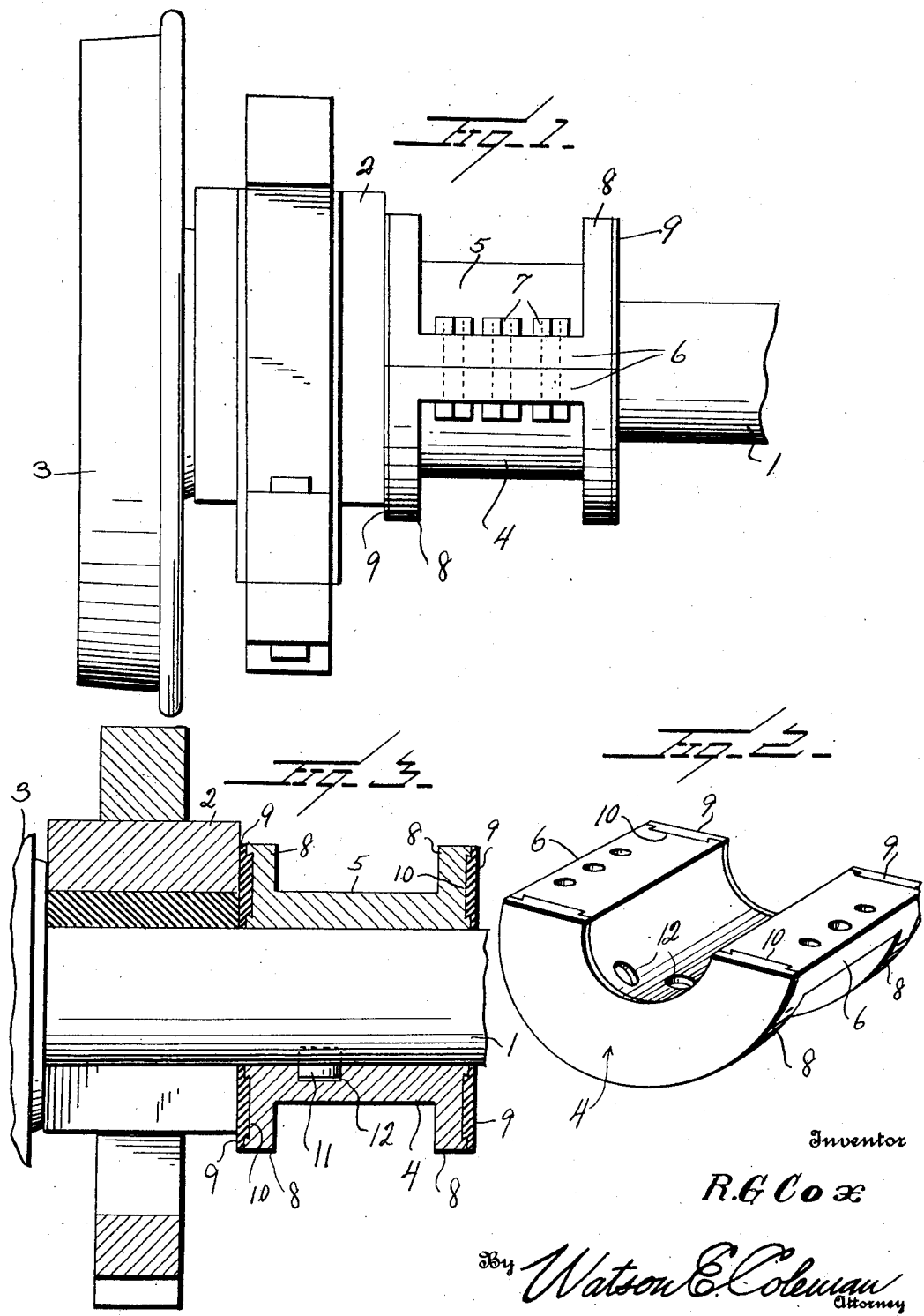

ROBERT G. COX, OF SAVANNAH, GEORGIA.

LOCOMOTIVE ATTACHMENT.

1,400,267.  Specification of Letters Patent.  Patented Dec. 13, 1921.

Application filed August 10, 1921. Serial No. 491,216.

*To all whom it may concern:*

Be it known that I, ROBERT G. COX, a citizen of the United States, residing at Savannah, in the county of Chatham and State of Georgia, have invented certain new and useful Improvements in Locomotive Attachments, of which the following is a specification, reference being had to the accompanying drawings.
This invention relates to locomotive attachments, and more particularly to devices for taking up lateral wear and preventing excessive lateral thrust or movement of the axle in the driving box.
It is usual to provide wear plates or hub liners arranged between the driving wheels and the driving box which act as thrust bearings and fill any lateral space, thus preventing any undue lateral movement. In applying these hub liners or wearing plates it, however, is necessary to remove certain parts of the locomotive, dropping the wheels or tying up the locomotive. Therefore, the object of this invention is to provide a simple and efficient attachment which may be applied to the driving axle so as to take up any lateral movement and to provide an efficient thrust bearing, this to be accomplished wthout removing any parts of the locomotive or tying up the same.

Another object of the invention is the provision of a device of this character which can be conveniently and rapidly attached to the driving axle of the locomotive without removing any parts thereof and which may be adjusted to take up wear as needed and in a minimum space of time.

A still further object of the invention is the provision of a device of this character which may be rapidly and conveniently attached to the locomotive axle which may be adjusted until its bearing surface is completely worn out and then reversed, so as to present a new bearing surface.
Further objects of the invention will appear as the following specific description is read in connection with the accompanying drawings which form a part of this application, and in which:
Figure 1 is an elevation of the driving axle of a locomotive with my improved attachment applied thereto;

Fig. 2 is a perspective view of one-half of the collar embodying my invention; and Fig. 3 is a vertical sectional view taken longitudinally of Fig. 1.

Referring more particularly to the drawing, 1 represents a driving axle of a locomotive which is mounted in the driving box 2 and carries upon its outer face the usual driving wheel 3, all of which parts are old and well known and need no further description.

My attachment comprises a split collar whose separate halves are indicated at 4 and 5, each substantially semi-circular in outline and provided with diametrically opposite radially extending flanges 6 connected together when in applied position upon the axle by bolts 7. The halves 4 and 5 are also provided with semi-circular marginal flanges 8 to which are attached in any suitable manner the semi-circular bearing strips 9 adapted to bear against the inner face of the driving box 2. As shown in Fig. 2, the semi-circular bearing plates consist of a babbitted face which is held firmly to the opposite flanges 8 by means of a dove tail groove 10 extending around the outer faces of said flanges. This is one form of attaching a bearing face to the flanges of the collar but it will be obvious that semi-circular bearing strips of babbitt or bronze, or any other suitable metal, may be attached to the flanges in a number of other ways which need not be specifically described herein.

In applying my attachment to the axle of a locomotive, the axle is drilled to form a socket in which is secured a stud 11 which may be secured in position by sweating, shrinking, or by driving fit, as is found most desirable in practice. One of the halves, in this instance the half 4, is provided with a plurality of apertures or sockets 12 arranged to receive the stud 11. These apertures, as shown, are arranged in different longitudinal planes and also in different transverse planes, so that when the wearing plate 9 at one end of the collar is worn down and undue lateral play exists the bolts 7 may be removed and the stud 11 engaged in one of the sockets 12 farther removed away from the flange 8 than the one with which the stud was previously engaged.

Any number of the sockets 12 may be arranged in either of the halves of the collar so that when one wear plate 9 has become unduly worn, the collar may be reversed upon the axle and the wear plate 9 at the opposite end be presented to the driving box. As the wear plates 9 are made of a metal considerably softer in texture than the metal of the driving box, it will be seen that the driving box itself will receive very little wear and any wear that it does receive may be readily taken up by the adjustment of the collar on the axle. However, as most of the wear is upon the softer wear plates 9, it will be an extremely rare occasion when the driving box will have to be replaced.

When the wear plates 9 are attached in the manner shown, the collars may be removed, heated to remove the babbitt and re-babbitted, when they will be equally as good as new. If the plates are bronze plates screwed on, it will be also seen that they may be removed and renewed when desired.

What I claim is:

1. In a lateral take up device of the character described, the combination with a locomotive axle, of a take up device reversibly secured to the axle and wear plates on opposite ends of the device.

2. In a lateral take up device for locomotive driving axles, the combination with a locomotive axle, of a take up device removably mounted upon the axle, means for adjusting the same longitudinally of the axle, said device being reversibly mounted upon the axle, and wear plates at opposite ends of the device.

3. A lateral take up device for locomotive axles, the combination with a locomotive axle and a driving box therefor, of a split collar reversibly mounted upon the axle, and means on the axle and collar for preventing longitudinal displacement thereof and for holding the collar in varied adjusted positions toward and away from the driving box.

4. In a lateral take up device for locomotive axles, the combination with an axle and a driving box therefor, of a collar surrounding the axle and reversibly secured thereon, and coacting means on the collar and axle for holding the collar against longitudinal shifting on the axle in either position thereof, and for holding the same in adjusted position with respect to the driving box.

In testimony whereof I hereunto affix my signature.

ROBERT G. COX.